(12) United States Patent
Usui

(10) Patent No.: US 9,362,857 B2
(45) Date of Patent: *Jun. 7, 2016

(54) MOTOR CONTROL DEVICE

(71) Applicant: KABUSHIKI KAISHA TOKAI RIKA DENKI SEISAKUSHO, Aichi (JP)

(72) Inventor: Yusuke Usui, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 304 days.

This patent is subject to a terminal disclaimer.

(21) Appl. No.: 13/971,221

(22) Filed: Aug. 20, 2013

(65) Prior Publication Data

US 2014/0055072 A1 Feb. 27, 2014

(30) Foreign Application Priority Data

Aug. 27, 2012 (JP) ................................. 2012-186826

(51) Int. Cl.
*H02P 6/00* (2006.01)
*H02P 7/00* (2016.01)
*H02P 27/08* (2006.01)

(52) U.S. Cl.
CPC . *H02P 7/00* (2013.01); *H02P 27/08* (2013.01)

(58) Field of Classification Search
CPC ................................. H02P 6/085; H02P 6/001
USPC ................. 318/599, 811, 400.26, 400.29
See application file for complete search history.

(56) References Cited

U.S. PATENT DOCUMENTS

| | | | | |
|---|---|---|---|---|
| 4,924,158 | A | * | 5/1990 | Kelley et al. ................... 318/434 |
| 5,081,404 | A | * | 1/1992 | Kelley et al. ................... 318/434 |
| 5,343,382 | A | * | 8/1994 | Hale et al. ........................ 363/98 |
| 5,744,922 | A | * | 4/1998 | Neary et al. .................... 318/293 |
| 5,952,856 | A | * | 9/1999 | Horiguchi et al. ............. 327/110 |
| 6,055,960 | A | | 5/2000 | Marumoto et al. |
| 6,253,733 | B1 | | 7/2001 | Marumoto et al. |

(Continued)

FOREIGN PATENT DOCUMENTS

| | | |
|---|---|---|
| JP | 2000-018069 | 1/2000 |
| JP | 2006-197669 | 7/2006 |
| JP | 2010-068682 | 3/2010 |

OTHER PUBLICATIONS

JPO Office Action dated Jun. 17, 2014 and english translation of reasons for rejection.

(Continued)

*Primary Examiner* — Rina Duda
(74) *Attorney, Agent, or Firm* — Roberts Mlotkowski Safran & Cole, PC

(57) ABSTRACT

A motor control device includes an H-bridge circuit for controlling on/off of a current fed to a motor, a drive circuit for driving the H-bridge circuit, a drive command signal generator for generating a drive command signal including a pulse signal having a predetermined drive frequency for sending a command to drive the motor, a current detection circuit that includes a current detection resistor and a comparator connected in series with the motor and outputs a comparison output signal based on comparison between a current detection signal of a motor current and a target value signal, a latch circuit for holding a current detection result based on an ON signal of the drive command signal and the comparison output signal, and a gate circuit for driving the drive circuit based on the ON signal of the drive command signal and a latch output signal from the latch circuit.

7 Claims, 5 Drawing Sheets

(56) References Cited

U.S. PATENT DOCUMENTS

| | | | |
|---|---|---|---|
| 6,384,556 B1 * | 5/2002 | Mizumoto et al. | 318/293 |
| 2001/0015196 A1 | 8/2001 | Marumoto et al. | |
| 2006/0158140 A1 | 7/2006 | Furuki | |
| 2010/0014196 A1 * | 1/2010 | Oku | 361/33 |
| 2010/0066286 A1 | 3/2010 | Furuki et al. | |

OTHER PUBLICATIONS

CN Office Action dated Jun. 3, 2015 and english translation.

* cited by examiner

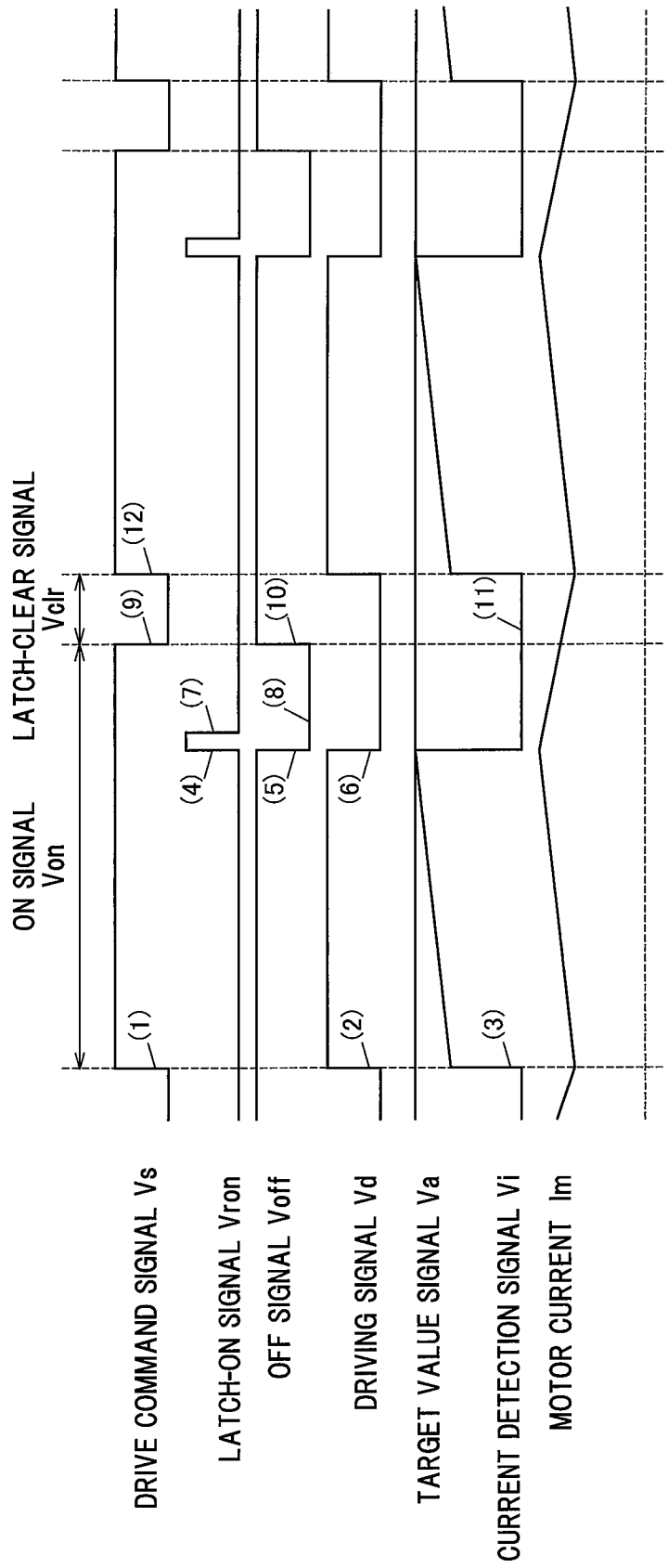

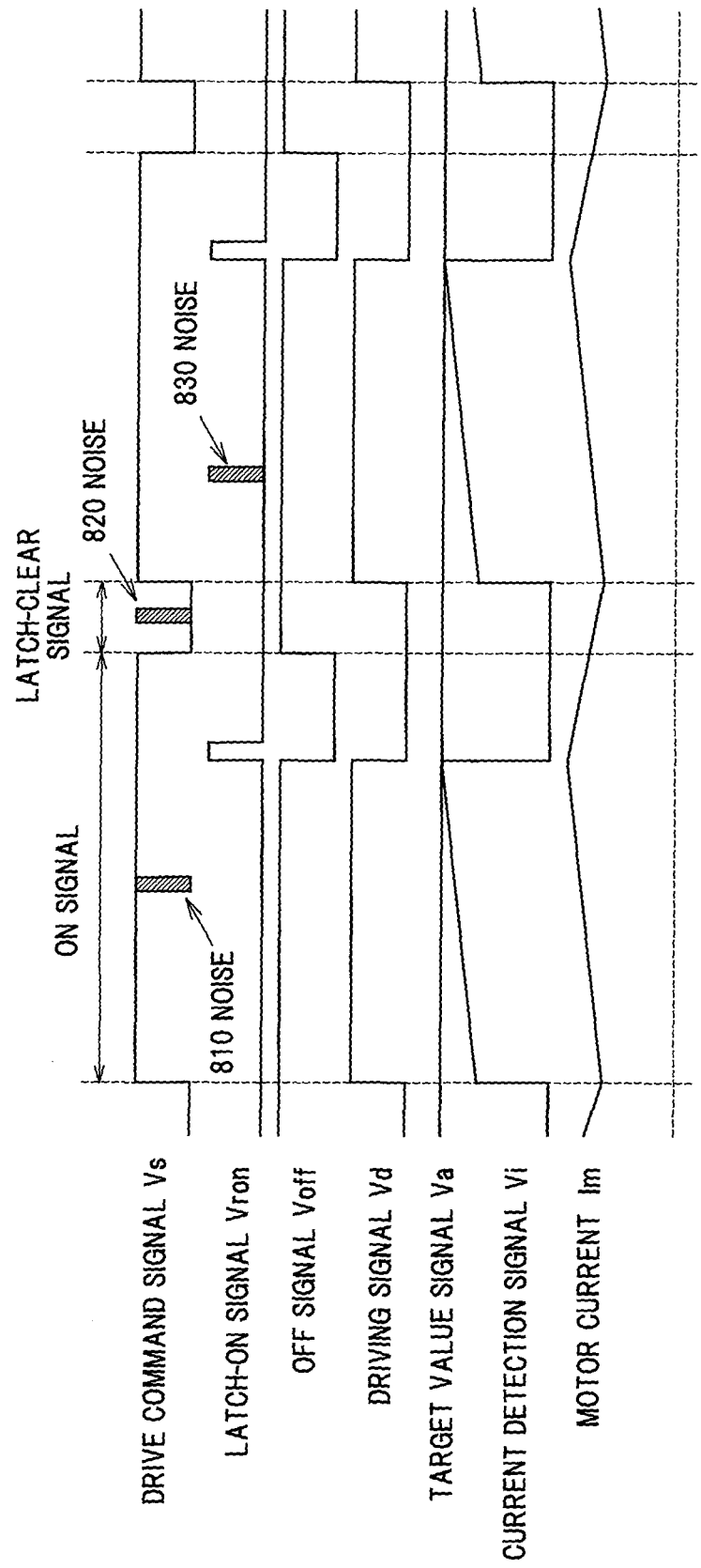

MOTOR CONTROL DEVICE

The present application is based on Japanese patent application No. 2012-186826 filed on Aug. 27, 2012, the entire contents of which are incorporated herein by reference.

BACKGROUND OF THE INVENTION

1. Field of the Invention

The invention relates to a motor control device.

2. Description of the Related Art

Some motor control devices are known that are adapted to conduct an electronic throttle control of a vehicle by controlling rotation of a motor (see, e.g., JP-A-2000-18069).

In the motor control devices, a digital control using an inexpensive microcomputer is conducted for the valve opening control of an electronic throttle valve, an analog control is conducted for the current control of the motor provided at a minor loop of the opening control which requires a quick response and a high accuracy, and a variable frequency PWM (pulse width modulation) control is used as the current PWM control.

However, if the variable frequency PWM control is used as the current PWM control, a problem may occur that a variation in drive frequency causes a harsh buzzing noise etc. during the motor drive control.

SUMMARY OF THE INVENTION

It is an object of the invention to provide a motor control device that can at a constant period control the driving of a motor regardless of rise time of motor current.

(1) According to one embodiment of the invention, a motor control device comprises:

an H-bridge circuit to control on/off of a current fed to a motor;

a drive circuit to drive the H-bridge circuit;

a drive command signal generator to generate a drive command signal comprising a pulse signal having a predetermined drive frequency for sending a command to drive the motor;

a current detection circuit comprising a current detection resistor and a comparator connected in series with the motor and being operable to output a comparison output signal based on comparison between a current detection signal of a motor current and a target value signal;

a latch circuit to hold a current detection result based on an ON signal of the drive command signal and the comparison output signal; and a gate circuit to drive the drive circuit based on the ON signal of the drive command signal and a latch output signal from the latch circuit.

In the above embodiment (1) of the invention, the following modifications and changes can be made.

(i) The latch circuit is switched to a drive level or a non-drive level based on a latch-ON signal output from the current detection circuit and a latch-clear signal of the drive command signal.

(ii) The gate circuit comprises an AND circuit to input the ON signal of the drive command signal and the latch output signal of the latch circuit.

(iii) The drive command signal is used as a power source of the latch circuit, and wherein the latch circuit is operable to be turned on only when the drive command signal outputs the ON signal.

(iv) The latch circuit outputs the latch output signal to render the drive circuit incapable of being driven if the current detection circuit exceeds the target value signal when the drive command signal outputs the ON signal.

(v) The drive command signal has a pulse waveform with a predetermined duty ratio that is defined by an ON-signal portion and a latch-clear signal portion.

(vi) The drive command signal is configured to render the drive circuit incapable of being driven by being synchronized with the predetermined drive frequency.

POINTS OF THE INVENTION

According to one embodiment of the invention, a motor control device is configured such that a driving signal Vd always becomes Lo-level by being synchronized with the switching edge of a drive command signal Vs from Hi to Lo-level even when a current detection signal Vi does not reach a target value signal Va during the ON signal Von period of the drive command signal Vs. Thus, the driving and non-driving of a motor are alternated completely in synchronization with the drive frequency of the drive command signal Vs. Thereby, the variation in drive frequency can be suppressed.

BRIEF DESCRIPTION OF THE DRAWINGS

Next, the present invention will be explained in more detail in conjunction with appended drawings, wherein:

FIG. 4 is a diagram illustrating waveforms at the main points during operation of the motor control device in the embodiment of the invention; and FIG. 5 is a diagram illustrating waveforms at the main points during operation when noise is injected.

DESCRIPTION OF THE PREFERRED EMBODIMENTS

Overall Structure of Motor Control Device 1

Figure 1:
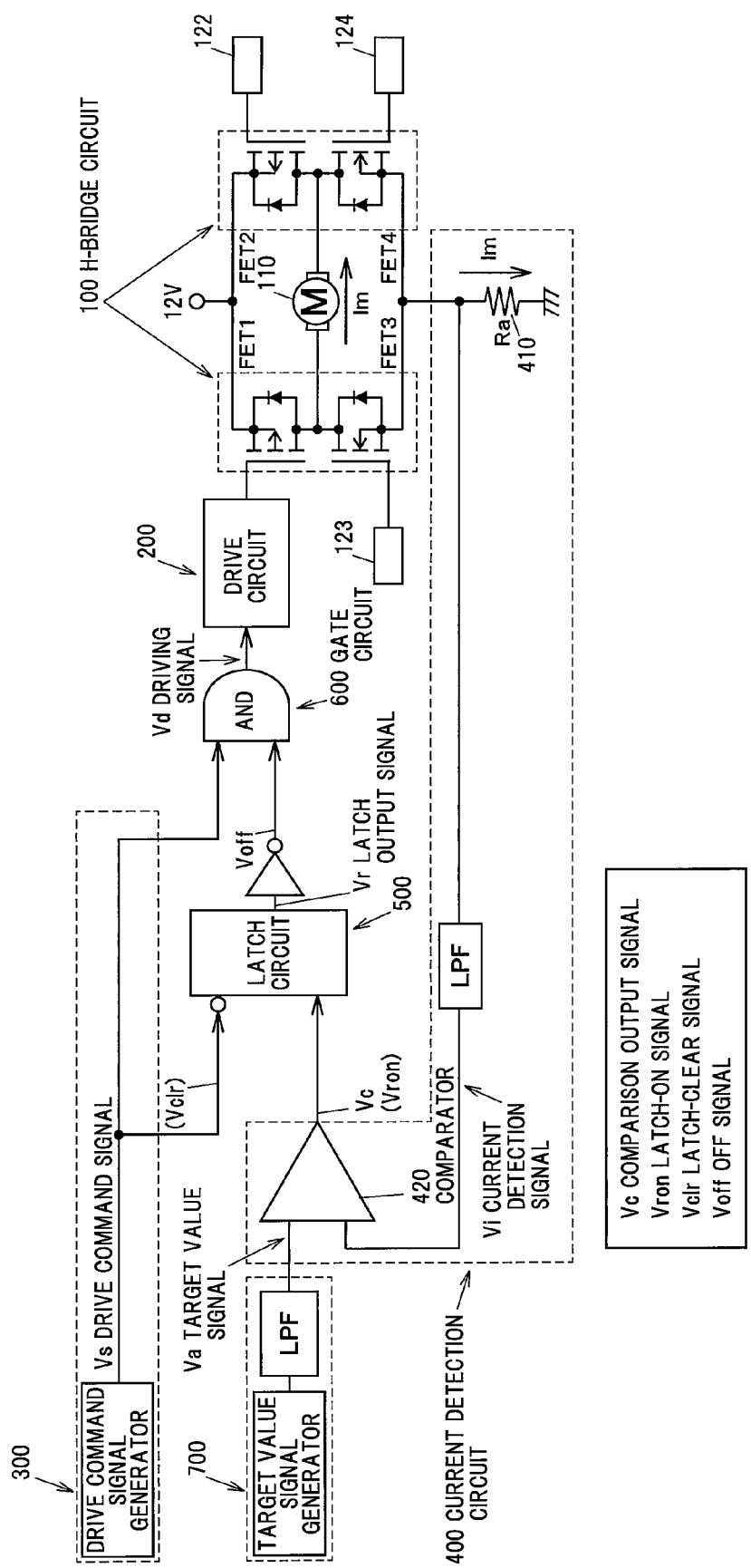
FIG. 1 is an overall block diagram illustrating a motor control device in an embodiment of the present invention.
Figure 2:
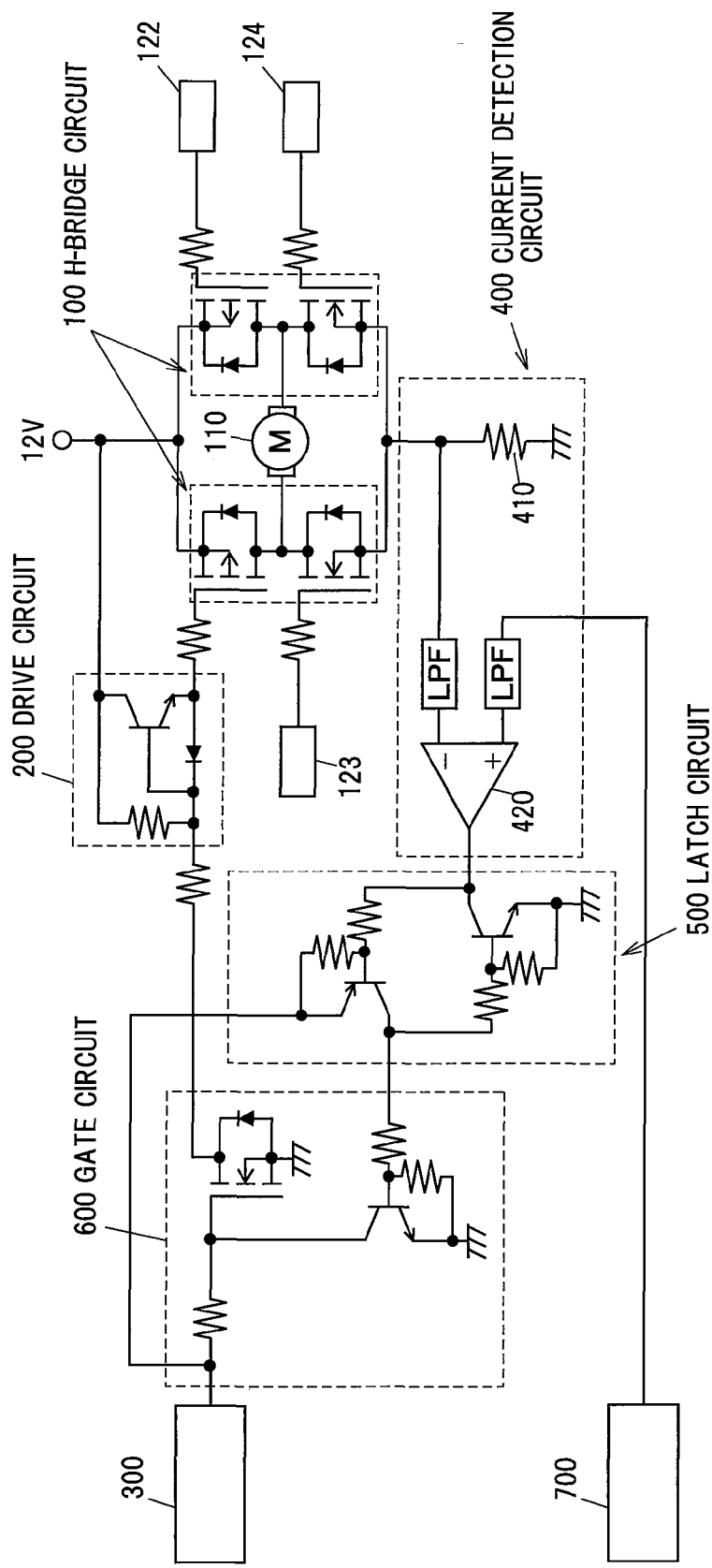
FIG. 2 is a circuit diagram illustrating the motor control device in the embodiment of the invention.

FIG. 1 is an overall block diagram illustrating a motor control device in an embodiment of the invention. FIG. 2 is a circuit diagram illustrating the motor control device in the embodiment of the invention.

A motor control device 1 in the embodiment of the invention is schematically composed of an H-bridge circuit 100 for controlling on/off of a current Im fed to a motor 110, a drive circuit 200 for driving the H-bridge circuit 100, a drive command signal generator 300 for generating a drive command signal Vs which is a pulse signal having a predetermined drive frequency to drive the motor 110, a current detection circuit 400 which is composed of a current detection resistor 410 and a comparator 420 connected in series with the motor 110 and outputs a comparison output signal Vc based on comparison between a current detection signal Vi of the motor current Im and a target value signal Va, a latch circuit 500 for holding a current detection result based on an ON signal Von of the drive command signal Vs and the comparison output signal Vc, and a gate circuit 600 for driving the drive circuit 200 based on the ON signal Von and a latch output signal Vr from the latch circuit 500.

The H-bridge circuit 100 is composed of four MOSFETs which are bridged such that the motor 110 is connected between a FET 1 and a FET 3 and between a FET 2 and a FET 4. The motor 110 runs forward when turning on the FETs 1 and 4 and turning off the FETs 2 and 3. Conversely, the motor 110 runs backward when turning off the FETs 1 and 4 and turning on the FETs 2 and 3. Accordingly, the rotation of the motor 110 is controlled by combination and timing of ON/OFF of the MOSFETs. For the combination and timing of ON/OFF of the MOSFETs, predetermined on/off signals are input to the drive circuit 200, logic signal input terminals 122, 123 and 124.

To the drive circuit 200, the gate circuit 600 is connected on the input side and the H-bridge circuit 100 is connected on the output side. Switching of the FETs is controlled based on a driving signal Vd output from the gate circuit 600 to drive the H-bridge circuit 100.

The drive command signal generator 300 generates the drive command signal Vs as a PWM (Pulse Width Modulation) signal for driving the motor 110. Using, e.g., a PWM function of a microcomputer, it is possible to generate the drive command signal Vs which is an output inverted between Hi-level and Lo-level at regular intervals. The drive command signal Vs as an output is connected to the latch circuit 500 and the gate circuit 600.

The current detection circuit 400 is composed of the current detection resistor 410 and the comparator 420 connected in series with the motor 110 and outputs the comparison output signal Vc based on comparison between the current detection signal Vi of the motor current Im and the target value signal Va. The output of the current detection circuit 400 is connected as the comparison output signal Vc to the input side of the latch circuit 500. When, for example, the H-bridge circuit 100 is driven by turning on the drive circuit 200 and a current flows through the motor 110, the same current (Im) as that fed to the motor 110 also flows through the current detection resistor 410 which is connected to the motor 110. Due to the motor current Im fed to a resistor Ra of the current detection resistor 410, the current detection signal Vi (=Ra× Im) is generated at both ends of the current detection resistor 410. The comparator 420 compares the current detection signal Vi with the target value signal Va produced by a target value signal generator 700, the comparison output signal Vc as the Lo-level output of the comparator 420 is generated when the current detection signal Vi becomes greater than the target value signal Va, and a latch-ON signal Vron obtained by inverting the comparison output signal Vc is output toward the latch circuit 500. Note that, if an LPF is provided between the current detection resistor 410 and the comparator 420, it can be expected that noise generated by inrush current, etc., into the motor 110 is removed.

The latch circuit 500 latches (holds) a current detection result based on the drive command signal Vs and the comparison output signal Vc. Hi-level of the latch circuit 500 is based on the latch-ON signal Vron which is obtained by inverting the comparison output signal Vc as the output of the current detection circuit 400 and is input to the latch circuit 500, and Lo-level of the latch circuit 500 is based on a latch-clear signal Vclr of the drive command signal Vs. The latch circuit 500 holds the output from the comparator 420, generates an OFF signal Voff by inverting the latch output signal Vr and outputs the OFF signal Voff toward the gate circuit 600. Here, an initial value of the OFF signal Voff is Hi-level output. In addition, the latch circuit 500 becomes a holding state due to edge triggering of the latch-ON signal Vron of the comparator 420 from Lo to Hi-level and provides Hi-level output. The output of the latch circuit is input as the OFF signal Voff to the gate circuit 600 via a NOT circuit (Hi-level output from the latch circuit=Lo-level "OFF signal"). Meanwhile, the drive command signal Vs which is switched to Lo-level during the holding state functions as the latch-clear signal Vclr and releases the holding state of the latch circuit 500, which causes the latch circuit 500 to provide Lo-level output. In other words, the latch circuit 500 is switched to a drive level or a non-drive level based on the latch-ON signal Vron output from the current detection circuit 400 and the latch-clear signal Vclr of the drive command signal Vs. The latch output signal Vr of the latch circuit 500 is input as the OFF signal Voff to the gate circuit 600 via the NOT circuit (Lo-level output from the latch circuit=Hi-level "OFF signal").

The gate circuit 600 drives the drive circuit 200 based on the drive command signal Vs and the latch output signal Vr from the latch circuit 500. The gate circuit 600 is an AND circuit which takes the ON signal Von of the drive command signal Vs and the OFF signal Voff obtained by inverting the latch output signal Vr of the latch circuit 500 as inputs. When the ON signal Von and the OFF signal Voff which are input to the gate circuit 600 are Hi-level, Hi-level is output from the gate circuit 600 and turns on the FET 1 (FET 2) of the H-bridge circuit 100 via the drive circuit 200.

The target value signal generator 700 generates the target value signal Va which indicates a target current value and is sent to the current detection circuit 400. The target value signal Va output from the target value signal generator 700 is input as DC voltage to the comparator 420 of the current detection circuit 400. The target value signal Va is, e.g., a signal converted into DC voltage via the LPF using a PWM function of a microcomputer but may be an output of D/A converter of the microcomputer.

Figure 3:
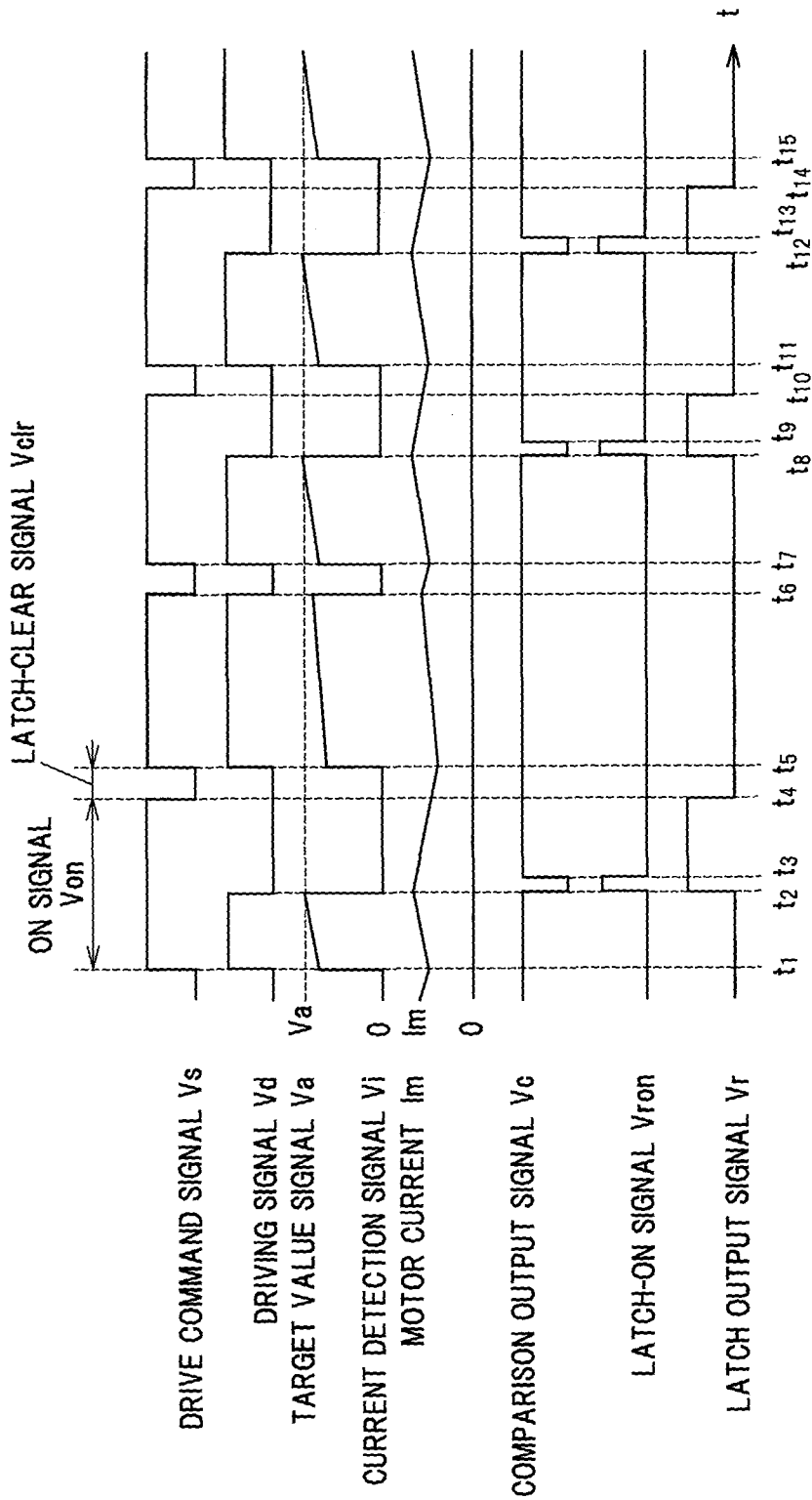
FIG. 3 is a diagram illustrating waveforms at main points of the motor control device in the embodiment of the invention.

FIG. 3 is a diagram illustrating waveforms at main points of the motor control device in the embodiment of the invention.

The drive command signal Vs is a PWM (Pulse Width Modulation) signal having a drive frequency of, e.g., 20 kHz of which one cycle is composed of an ON-signal portion (Hi-level) and a latch-clear signal portion (Lo-level). The drive command signal Vs has a pulse waveform with a predetermined duty ratio that is defined by the ON-signal portion and the latch-clear signal portion.

Here, the ON signal Von and the latch-clear signal Vclr form one cycle of the drive command signal Vs, as shown in FIG. 3, etc. The ON signal Von is Hi-level output period of the drive command signal Vs. The latch-clear signal Vclr is L-level output period of the drive command signal Vs.

The driving signal Vd is a signal which is input to the drive circuit 200 from the gate circuit 600 to control on/off of the drive circuit 200. The driving signal Vd is produced by an AND output of the drive command signal Vs and the OFF signal Voff. Therefore, when Hi-level of the drive command signal Vs is input and also the OFF signal Voff obtained by inverting the latch output signal Vr is Hi-level output, the gate circuit 600 provides Hi-level output to allow the drive circuit 200 to be driven.

The target value signal Va is a DC voltage signal indicating a target current value sent to the current detection circuit 400 and is reference voltage (threshold level) of the comparator 420. The motor current Im is controlled by adjusting the target value signal Va, thereby allowing steady-state rotational speed of the motor to be adjusted.

As described above, the current detection signal Vi is generated at the both ends of the current detection resistor 410 and Vi=Ra×Im. As shown in FIG. 3, since the motor current Im increases during the Hi-level period of the driving signal Vd, the current detection signal Vi is a waveform which increases up to the target value signal Va as the Max value during this period.

The motor current Im is a current fed to the motor 110 which is driven by the drive circuit 200 during the Hi-level period of the driving signal Vd.

The comparison output signal Vc is produced based on comparison between the current detection signal Vi of the motor current Im and the target value signal Va. In the comparator 420, the comparison output signal Vc as the Lo-level output of the comparator 420 is produced when the current detection signal Vi becomes greater than the target value signal Va. Note that, the latch-ON signal Vron obtained by inverting the comparison output signal Vc is input to the latch circuit 500.

Hi-level of the latch output signal Vr is based on the latch-ON signal Vron input from the current detection circuit 400 and Lo-level of the latch output signal Vr is based on the latch-clear signal Vclr of the drive command signal Vs, as described for the latch circuit 500. As shown in FIG. 3, the latch output signal Vr becomes Hi-level by being triggered at the rising edge of the latch-ON signal Vron at $t_2$ and becomes Lo-level by being triggered by the latch-clear signal Vclr (at falling edge of the drive command signal Vs at $t_4$). From this onward, the latch output signal Vr is produced according to the same logic.

Operation of Motor Control Device 1

FIG. 4 is a diagram illustrating waveforms at the main points during operation of the motor control device in the embodiment of the invention. The operation of the motor control device 1 will be described below in the order of the numbers (1) to (12) which are indicated on the waveforms at the main points during operation shown in FIG. 4.

(1) The output of the drive command signal Vs becomes Hi-level.

(2) The output of the driving signal Vd becomes Hi-level (during the ON signal Von period) and the FET 1 (FET 2) is turned on.

(3) The current detection signal Vi is generated due to the motor current Im.

(4) Hi-level of the latch-ON signal Vron is output when the current detection signal Vi exceeds the target value signal Va.

(5) The output of the OFF signal Voff as the inverted output from the latch circuit 500 becomes Lo-level.

(6) The driving signal Vd is switched to Lo-level due to Lo-level output of the OFF signal Voff, thereby turning off the FET 1 (FET 2).

(7) Since the current detection signal Vi becomes 0V by turning off the FET 1 (FET 2), the latch-ON signal Vron is switched to Lo-level output.

(8) Although the latch-ON signal Vron is switched to Lo-level output, the output of the OFF signal Voff is kept Lo-level by the latch circuit 500.

(9) After a certain period of time, the drive command signal Vs is switched to Lo-level (switched from the ON signal Von to the latch-clear signal Vclr).

(10) At the switching edge of the drive command signal Vs from Hi to Lo-level (when switched to the latch-clear signal Vclr), the holding state of the latch circuit 500 is released (the OFF signal Voff from the latch circuit is switched from Lo-level to Hi-level).

(11) The driving signal Vd continues staying Lo-level during the Lo-level period of the drive command signal Vs (during the latch-clear signal Vclr period).

(12) After a certain period of time, the drive command signal Vs is switched to Hi-level (switched to the ON signal Von).

From this onward, the operations of (1) to (12) are repeated and the motor 110 is driven with a constant current at a current value which is determined by the current detection circuit 400 so as to corresponding to the target value signal Va.

Even in the case that the current detection signal Vi does not reach the target value signal Va during the ON signal Von period of the drive command signal Vs in the operation (4), the driving signal Vd is synchronized with the switching edge of the drive command signal Vs from Hi to Lo-level and therefore necessarily becomes Lo-level. As a result, the driving and non-driving states of the motor 110 are repeated due to complete synchronization with the drive frequency of the drive command signal Vs.

This results from that the latch circuit 500 can stay in the ON-state only during the Hi-level (ON signal Von) period of the drive command signal Vs and is it is an effect of the configuration in which the drive command signal Vs is used as a power source of the latch circuit 500, as shown in FIGS. 1 and 2.

EFFECTS OF THE EMBODIMENT OF THE INVENTION

The motor control device 1 configured as described above has the following effects.

(1) In the motor control device 1 in the embodiment of the invention, the driving signal Vd necessarily becomes Lo-level by being synchronized with the switching edge of the drive command signal Vs from Hi to Lo-level even when the current detection signal Vi does not reach the target value signal Va during the ON signal Von period of the drive command signal Vs. As a result, the driving and non-driving states of the motor 110 are repeated due to complete synchronization with the drive frequency of the drive command signal Vs. Accordingly, drive frequency variation is suppressed. Even when the drive command signal Vs is, e.g., 20 kHz, frequency is not shifted toward the low-frequency side and drive frequency in an audible range is not generated, which allows generation of harsh buzzing noise, etc., to be suppressed.

(2) Due to the configuration in which the drive command signal Vs is used as a power source of the latch circuit 500, the latch circuit 500 stays in the ON-state only during the Hi-level (ON signal Von) period of the drive command signal Vs and the driving and non-driving states of the motor 110 are repeated due to complete synchronization with the drive frequency of the drive command signal Vs. As a result, it is possible to provide a motor control device which can periodically control a motor drive regardless of rise time of motor current.

(3) FIG. 5 is a diagram illustrating waveforms at the main points during operation when noise is injected. Noise 810 which is injected during Hi-level of the drive command signal Vs could turn off the driving signal Vd, resulting in an incorrect operating mode to stop the motor. However, in practice, the motor is not stopped by instantaneous noise and there is no effect on the operation. Meanwhile, noise 820 which is injected during Lo-level of the drive command signal Vs could turn on the driving signal Vd, resulting in an incorrect operating mode to operate the motor. However, in practice, the motor is not operated by instantaneous noise since the latch circuit 500 does not hold the state during this period. In addition, noise 830 which is injected during Lo-level of the latch-ON signal Vron turns off the driving signal Vd and switches to an operating mode to stop the motor. Therefore, in any of these cases, it is possible to realize a motor control device which operates in safe mode in case of occurrence of incorrect operation due to noise (i.e., operates in an operating mode in which the motor is stopped by noise).

Although the embodiment of the invention has been described, the embodiment is merely exemplified and the invention according to claims is not to be limited thereto. The new embodiment and modifications thereof may be implemented in various other forms, and various omissions, substitutions and changes, etc., can be made without departing from the gist of the invention. In addition, all combinations of the features described in the embodiment are not necessary to solve the problem of the invention. Further, the embodiment and modifications thereof are included within the scope and gist of the invention and also within the invention described in the claims and the range of equivalency.

What is claimed is:

1. A motor control device, comprising:
an H-bridge circuit to control on/off of a current fed to a motor;
a drive circuit to drive the H-bridge circuit;
a drive command signal generator to generate a drive command signal comprising a pulse signal having a predetermined drive frequency for sending a command to drive the motor;
a current detection circuit comprising a current detection resistor and a comparator connected in series with the motor and being operable to output a comparison output signal based on comparison between a current detection signal of a motor current and a target value signal;
a latch circuit that receives and holds a current detection result based on an ON signal of the drive command signal and the comparison output signal, and which transmits a latch output signal; and
a gate circuit that generates a signal to drive the drive circuit upon receiving both the ON signal of the drive command signal and the latch output signal from the latch circuit.

2. The motor control device according to claim 1, wherein the latch circuit is switched to a drive level or a non-drive level based on a latch-ON signal outputted from the current detection circuit and a latch-clear signal of the drive command signal.

3. The motor control device according to claim 1, wherein the gate circuit comprises an AND circuit to input the ON signal of the drive command signal and the latch output signal of the latch circuit.

4. The motor control device according to claim 1, wherein the drive command signal is used as a power source of the latch circuit, and wherein the latch circuit is operable to be turned on only when the drive command signal outputs the ON signal.

5. The motor control device according to claim 4, wherein the latch circuit outputs the latch output signal to render the drive circuit incapable of being driven if the current detection circuit exceeds the target value signal when the drive command signal outputs the ON signal.

6. The motor control device according to claim 1, wherein the drive command signal has a pulse waveform with a predetermined duty ratio that is defined by an ON-signal portion and a latch-clear signal portion.

7. The motor control device according to claim 1, wherein the drive command signal is configured to render the drive circuit incapable of being driven by being synchronized with the predetermined drive frequency.

* * * * *